Aug. 29, 1939.  R. H. BECKMAN  2,171,170
WHEEL STRUCTURE
Filed Oct. 23, 1937
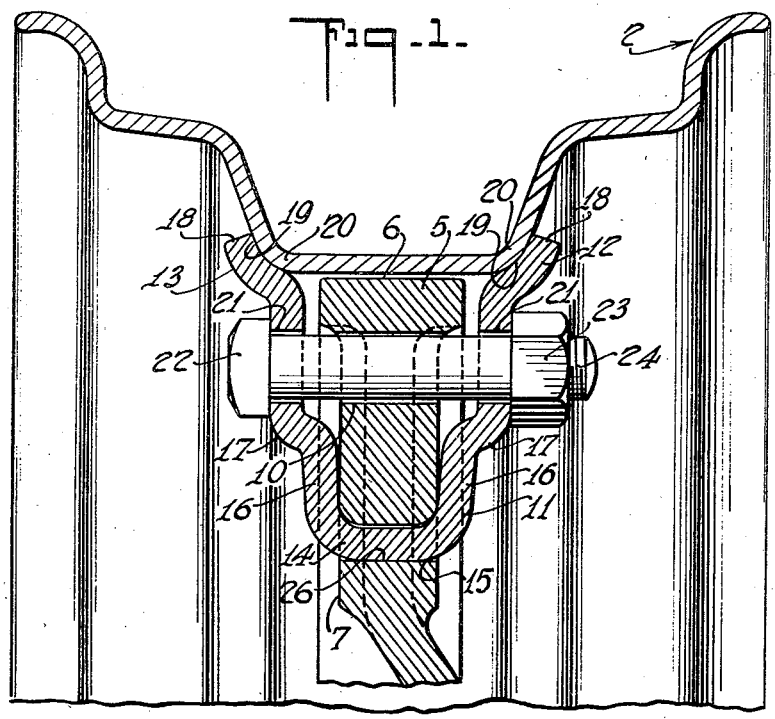
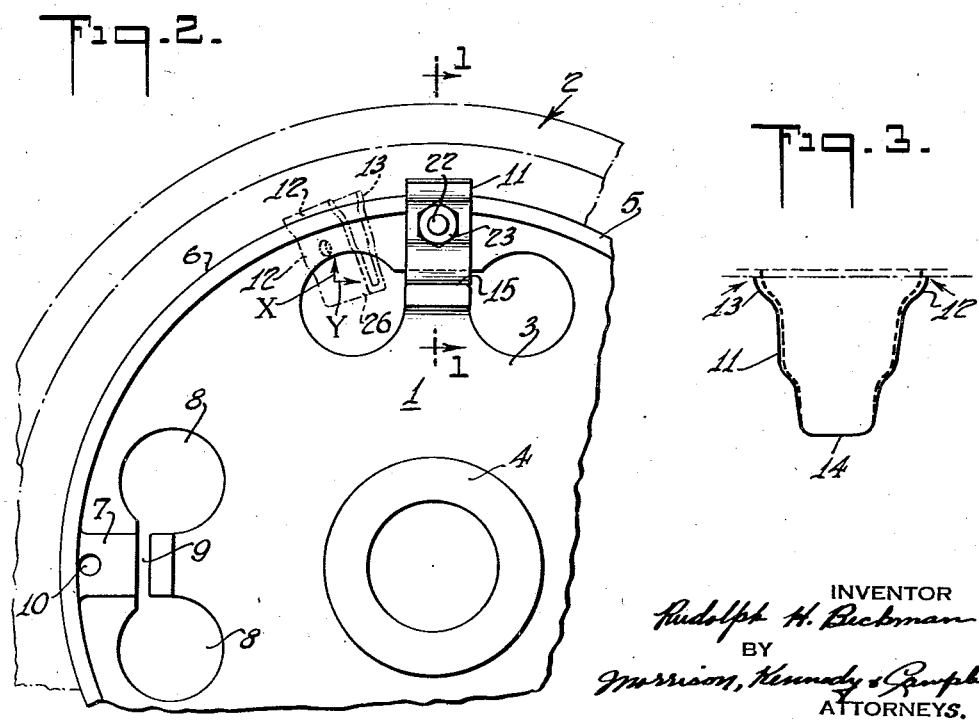
INVENTOR
Rudolph H. Beckman
BY
Morrison, Kennedy & Campbell
ATTORNEYS.

Patented Aug. 29, 1939

2,171,170

UNITED STATES PATENT OFFICE 2,171,170

WHEEL STRUCTURE

Rudolph H. Beckman, Davenport, Iowa, assignor to French & Hecht, Incorporated, a corporation of Iowa Application October 23, 1937, Serial No. 170,573

4 Claims. (Cl. 301—11)

This invention relates to wheel structures, and particularly to wheel structures of the demountable tire rim variety, wherein the rim is removably secured to the wheel body.

It is common practice in the manufacture of a tractor or other vehicle to mount the wheel bodies of demountable rim wheels on the chassis of the vehicle for which they are adapted before the rims are applied thereto, and to move the vehicle to different departments in the factory during its assemblage. This cannot be done readily and without damage to the surface over which the vehicle passes and to the wheel bodies, however, unless the latter have a smooth periphery or running surface, and generally, wheel bodies adapted for the support of demountable tire rims are not formed with smooth running surfaces, since the rim has an inside diameter greater than the outside diameter of the wheel felly and requires the provision of supporting surfaces which extend radially beyond the periphery of the felly. Ordinarily, a circumferentially extending bearing surface disposed at an angle to a plane perpendicular to the axis of the wheel is formed at one side edge of the peripheral surface of the wheel felly for engagement with one side edge of the rim, and the rim is secured on the wheel body by detachable wedge means fitted between the felly and the opposite side edge of the rim, the inclined bearing surface on the felly and the wedge means acting to center the rim with respect to the axis of the wheel as well as to support it on the wheel body. It has been proposed to provide detachable wedge means at both sides of the wheel felly, which, while permitting the formation of a felly having a smooth periphery, nevertheless, requires that the felly be substantially as wide as the contiguous portion of the tire rim in order to wedge between the rim and felly. Moreover, this latter arrangement also requires a greater number of separate loose parts, which are susceptible of being lost and are difficult to handle in mounting the rim on the wheel body. Furthermore, since there is no fixed inclined surface at one side of the felly, there is a greater opportunity for failure to center the rim both radially and axially of the wheel body, and utmost care must be exercised to tighten diametrically opposite wedges successively and gradually.

The present invention contemplates an improved demountable rim wheel structure, which, in its broader aspects, provides a wheel body and means mounted in the wheel body and adapted to support the rim thereon by engagement with the rim alone. More specifically, and in the particular embodiment of the invention set forth herein, the wheel body is formed with a smooth circumferentially continuous periphery devoid of rim supporting surfaces, and a plurality of U-shaped rim supporting clamp members are detachably mounted in the wheel body at spaced intervals circumferentially thereof. The rim clamps present opposed arms which extend radially beyond the periphery of the wheel body on axially opposite sides thereof for engagement with the opposite side edges of the rim, the arms being in axially spaced relation to the wheel body and formed intermediate their ends with holes adapted to register with holes in the wheel body and in which bolts are arranged for drawing the arms toward one another into clamping engagement with the rim.

In the accompanying drawing the invention has been shown merely by way of example and in preferred form, but obviously many variations and modifications may be made therein and in its mode of application which will still be comprised within its spirit. It is to be understood, therefore, that the invention is not limited to any specific form or embodiment except insofar as such limitations are specified in the appended claims.

Referring to the drawing:

Fig. 1 is a cross sectional elevation of a portion of wheel structure, showing the improvements embodied therein;

Fig. 2 is a side elevation of a portion of the improved wheel structure; and

Fig. 3 is a diagrammatic view of one of the rim supporting members.

According to a preferred embodiment of the invention, and as shown in the drawing, the wheel structure comprises a wheel body 1 on which a tire rim 2 is removably mounted. The wheel body 1 is of the disc type comprising a disc 3 equipped with a hub 4 and having a felly 5 formed integrally therewith and presenting a smooth circumferentially continuous peripheral surface 6, which provides a running surface in the absence of the tire rim 2. The disc 3 is thickened axially at spaced intervals circumferentially thereof to form lugs 7 which extend radially inwardly from the felly 5 on opposite sides of the disk 3. Adjacent each lug 7, a pair of large openings 8 are formed in the disk 3, one opening on each side of the lug, and each pair of openings 8 is connected by a slot 9 extending through the radially inner portion of the lug. Between the felly 5 and each of the slots 9, a bolt hole 10 is drilled to extend axially through the lug 7.

The rim 2 is adapted to be supported on the wheel body 1 by a plurality of rim supporting members in the form of spring clamps 11 formed substantially U-shape in cross section, thus presenting each opposed arms 12 and 13 connected by a crosspiece 14. The clamps 11 are adapted to be removably mounted in the wheel body 1 with the crosspieces 14 thereof seated on the radially inner walls 15 of the slots 9, which walls serve as bearing surfaces for supporting the clamps radially. The clamps 11 depart from their general U-shape by having the arms 12 and 13 formed so that portions 16 thereof which lead from the crosspieces 14 follow closely along the axially opposite sides of the lugs 7 for a short distance, the arms 12 and 13 then bending as at 17 so that they are in spaced relation to the axially opposite sides of the lugs 7 and the felly 5. The free ends 18 of the arms 12 and 13 extend radially beyond the periphery of the felly 5 and are formed with curved axially inner surfaces 19 conforming to the shape of the opposite side edges 20 of the rim 2. The arms 12 and 13 of the clamps 11 are formed with bolt holes 21 adapted to register with the bolt holes 10 extending through the lugs 7, and bolts 22 are arranged to extend through the bolt holes 21 and 10 for drawing the arms 12 and 13 toward one another into clamping engagement with the side edges 20 of the rim 2 when nuts 23 are screwed on the threaded ends 24 of the bolts (see Fig. 1).

Referring to Fig. 3, wherein the action of the spring clamps 11 has been shown diagrammatically, it will be noted that in the unsprung condition of the clamps (full lines) the arms 12 and 13 spread outwardly at an angle to a plane perpendicular to the crosspiece 14, and when sprung toward one another, as from the full line position to the dotted line position, the free ends 18 of the arms extend a greater distance radially from the crosspiece 14. Hence, when the arms 12 and 13 are drawn together by the bolt 22 into clamping engagement with the rim 2 they also exert a radial thrust on the rim which centers it with respect to the axis of the wheel.

The manner of inserting and removing the clamps 11 is illustrated in Fig. 2. As indicated by the left-hand clamp 11 shown in dotted lines, one arm 13 of the clamp is inserted through one of the openings 8 (either of the openings 8 may be used) and the clamp moved radially relatively to the wheel body 1 in the direction of the arrow X until the crosspiece 14 is within the opening 8 and the arms 12 and 13 of the member extend radially on opposite sides of the wheel body. The clamp 11 is then moved in the direction of the arrow Y into the slot 9, in which it fits nicely with its surface 26 seating on the radially inner wall 15 of the slot 9. It is pointed out that the rim 2 may be located on the wheel body either before any of the clamps 11 are inserted in place or when all but one of the clamps are in place and in unclamped condition. When all the clamps 11 have been mounted in the wheel body and the bolts 22 inserted through the bolt holes 21 and 10 of the arms 12 and 13 and lugs 7, respectively, and the nuts 23 screwed on the threaded ends 24 of the bolts, the nuts are then tightened to draw the arms 12 and 13 toward one another, this action, as already stated, centering the rim radially with respect to the axis of the wheel as well as securing it to the wheel body.

Of course, the steps are reversed to remove the clamps 11 in demounting the rim 2 from the wheel body.

With the foregoing arrangement, the combined radial rim centering and load forces are translated into tensioning stresses on the bolts by the tendency of the clamp arms 12 and 13 to spread apart, and because they are held against spreading by the bolts 22, the arms 12 and 13 transmit the radial forces to the crosspieces 14, which are supported radially by the bearing surfaces 15 of the slots 9. Hence, there is no shearing force whatever on the bolts 22. When the bolts 22 are tightened, not only are the free ends 18 of the arms 12 and 13 brought into clamping engagement with the rim 2, but the portions 16 thereof adjacent the crosspieces 14 are clamped against the axially opposite edges of the lugs 7. Hence, the clamps 11 are rigidly held against axial play and, being symmetrical, center the rim 2 axially on the wheel. The bolts 22 serve the additional function of holding the clamps 11 against bodily movement circumferentially when driving forces are exerted on the wheel by extending through the holes 10 in the wheel body 1 as well as through the holes 21 in the arms 12 and 13 of the clamps. Other features and advantages of the invention will be apparent to those skilled in the art and, therefore, need not be specified herein.

As already stated, a preferred embodiment of the invention has been shown in the accompanying drawing and described herein merely by way of example and in a particular application thereof. The invention is not limited, necessarily, to a wheel structure having a wheel body formed with a smooth continuous periphery, and may be embodied equally well in a fellyless wheel. For example, the wheel structure can comprise a wheel body having a hub with spokes radiating therefrom and formed for the mounting of the rim clamps in the radially outer ends of the spokes. Also, the side edges of the tire rim can be provided with recesses to accommodate the ends of the clamp arms so that the latter can hold the rim against relative circumferential movement when driving forces are exerted on the wheels. Moreover, the form, structure and arrangement of the rim clamps can be varied and modified without departing from the spirit of the invention. It is to be understood, therefore, that the invention is not limited to any specific form or embodiment except insofar as such limitations are specified in the appended claims.

Having thus described my invention, what I claim is:

1. In a wheel structure, the combination of a demountable rim, a wheel body, a plurality of bearing surfaces formed in the wheel body at spaced intervals circumferentially thereof, a plurality of rim securing means in the form of U-shaped members each supported on one of said bearing surfaces and presenting opposed arms which extend radially on axially opposite sides of the wheel body beyond the periphery thereof and engage the opposite side edges of the rim, and a fastening bolt extending through openings in the arm for drawing them into clamping engagement with the rim to secure the rim to the wheel body.

2. A wheel structure according to claim 1, wherein the wheel body is formed with openings for the insertion and removal of the rim securing members and slots communicating with said openings, the radially inner walls of the slots forming bearing surfaces for the radial support of said members in rim securing position.

3. A wheel structure according to claim 1, wherein the wheel body is formed with a plurality of circumferentially spaced paired openings for the insertion and removal of the rim securing members, each pair of openings having an intermediate slot communicating with both openings and the radially inner wall of which slot provides a bearing surface for the radial support of said members in rim securing position.

4. In a wheel structure, the combination of a demountable rim, a wheel body formed with a felly presenting a smooth circumferentially continuous peripheral surface, a plurality of openings formed in the wheel body in circumferentially spaced relation radially inwardly of the felly, slots communicating with the openings, a plurality of U-shaped rim supporting members removably mounted in the wheel body, the openings in the wheel body being provided for the insertion and removal of the members and the radially inner walls of the slots providing bearing surfaces for the radial support of the members with the arms thereof extending radially beyond the periphery of the felly on axially opposite sides thereof for engagement with the opposite side edges of the rim and being in axially spaced relation to the felly and wheel body, bolt holes formed in the arms and wheel body to register axially, and bolts arranged in said holes for drawing the arms toward one another into clamping engagement with the rim to center the rim with respect to the axis of the wheel and support it on the wheel body.

RUDOLPH H. BECKMAN.